(12) United States Patent
Okajima

(10) Patent No.: US 6,679,563 B2
(45) Date of Patent: Jan. 20, 2004

(54) BICYCLE WHEEL

(75) Inventor: Shinpei Okajima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/178,896

(22) Filed: Jun. 25, 2002

(65) Prior Publication Data

US 2003/0234571 A1 Dec. 25, 2003

(51) Int. Cl.$^7$ .................................. B60B 1/06
(52) U.S. Cl. ................................ 301/67; 301/58
(58) Field of Search .................... 152/381.6, 381.5, 152/513, 514, 427, DIG. 9, DIG. 16; 301/95.101, 95.104, 95.107, 58, 55, 110.5, 67, 75, 104

(56) References Cited

U.S. PATENT DOCUMENTS

| | | | | |
|---|---|---|---|---|
| 4,741,578 A | * | 5/1988 | Viellard | 301/64.704 |
| 4,824,177 A | * | 4/1989 | Aloy | 301/58 |
| 6,019,149 A | * | 2/2000 | Stringer | 152/381.5 |
| 6,126,243 A | * | 10/2000 | Okajima et al. | 301/58 |
| 2002/0060494 A1 | * | 5/2002 | Leo et al. | 301/67 |

* cited by examiner

*Primary Examiner*—S. Joseph Morano
*Assistant Examiner*—Frantz F. Jules
(74) *Attorney, Agent, or Firm*—Shinjyu Global IP Counselors, LLP.

(57) ABSTRACT

A spoked rim assembly includes an annular rim and a plurality of spokes. Each of the spokes is provided with a seal structure so that a tubeless tire can be used with the rim. The rim preferably has an annular recess with a plurality of spoke attachment openings. Each of the spokes has an outer end portion coupled to one of the spoke attachment openings. Each of the outer end portions of the spokes includes a support member and a resilient seal member that form the seal structure for the spoke. The support members and the seal members are arranged and configured such that the support members selectively contact the spoke attachment portion to prevent full compression of the seal members when a radial force is applied to the support members. The support members can be separate or integrally formed with the spokes.

37 Claims, 15 Drawing Sheets

BICYCLE WHEEL

BACKGROUND OF THE INVENTION

1. Field of the Invention

This invention generally relates to a bicycle wheel. More specifically, the present invention relates a bicycle wheel for use with a tubeless tire, which includes a spoked rim assembly having a seal structure with spokes coupled to the rim via support members and resilient seal members.

2. Background Information

Bicycling is becoming an increasingly more popular form of recreation as well as a means of transportation. Moreover, bicycling has also become a very popular competitive sport for both amateurs and professionals. Whether the bicycle is used for recreation, transportation or competition, the bicycle industry is constantly improving the various components of the bicycle. One particular component of bicycles, which has been extensively redesigned over the past years, is the bicycle wheel. Bicycle wheels are constantly being redesigned to be lightweight and more aerodynamic in design as well as to be simple to manufacture and assemble.

There are many different types of bicycle wheels, which are currently available on the market. Most bicycle wheels have a hub portion, a plurality of spokes and an annular rim. The hub portion is attached to a part of the frame of the bicycle for relative rotation. The inner ends of the spokes are coupled to the hub and extend outwardly from the hub. The annular rim is coupled to the outer ends of the spokes and has an outer portion for supporting a pneumatic tire thereon. Typically, the spokes of the bicycle wheel are thin metal wire spokes. The ends of the hub are usually provided with flanges that are used to couple the spokes to the hub. In particular, holes are provided in the hub flanges. The wire spokes are usually bent on their inner end and provided with a flange that is formed in the shape of a nail head. The inner end is supported in one of the holes in one of the hub flanges. The outer ends of the spokes typically are provided with threads for engaging spoke nipples, which secure the outer ends of the wire spokes to the rim. Alternatively, the spokes may be reversed.

In recent years, some of the above types of wheels have been designed to be used with tubeless tires. Typically, these wheels utilize an annular seal mounted to the outer portion of the rim to prevent air leaks. However, the use of an annular seal can allow leaking air, especially after prolonged use. Moreover, if a spoke needs to be replaced, the tire and annular seal have to be removed from the rim so the spoke can be replaced. Then, the seal and tire need to be replaced. This is inconvenient and can cause the seal and/or tire to be stretched or damaged.

There are some rims with tubeless tires on the market which do not include a plurality of holes in the outer portion for mounting the spokes, eliminating the need for an annular seal. However, these prior rims for tubeless tires suffer from other deficiencies. Specifically, these rims can be expensive and complicated to manufacture and assemble.

In view of the above, there exists a need for a spoked rim assembly having a seal structure which overcomes the above mentioned problems in the prior art. This invention addresses this need in the prior art as well as other needs, which will become apparent to those skilled in the art from this disclosure.

SUMMARY OF THE INVENTION

One object of the present invention is to provide a spoked rim assembly having a seal structure that maintains an airtight seal for a tubeless tire.

Another object of the present invention is to provide a spoked rim assembly having a seal structure that prevents damage to a plurality of seal members while maintaining a tight seal.

Another object of the present invention is to provide a spoked rim assembly having a seal structure that is relatively simple and inexpensive to manufacture and assemble.

Still another object of the present invention is to provide a spoked rim assembly having a seal structure that allows easy replacement of one or more spokes after the wheel is assembled.

Still another object of the present invention is to provide a spoked rim assembly for a tubeless tire that is relatively strong yet relatively lightweight.

The foregoing objects can basically be attained by providing a spoked rim assembly for a bicycle comprising an annular rim and a plurality of inwardly extending spokes. The annular rim has an annular recess with a first annular side portion, a second annular side portion and an annular spoke attachment portion extending between the first and second annular side portions to form a substantially U-shaped transverse cross-section. The annular spoke attachment portion has a plurality of circumferentially arranged spoke attachment openings formed therein. Each of the spokes has an outer end portion coupled to one of the spoke attachment openings and an inner end portion located radially inwardly of the outer end portion. Each of the outer end portions of the spokes includes a support member and a resilient seal member. The support members and the resilient seal members are arranged and configured such that the support members selectively contact the spoke attachment portion to prevent full compression of the seal members when a radial force is applied to the support members to compress the seal members.

The foregoing objects can also basically be attained by providing a seal structure for a spoked rim assembly comprising a support member and a resilient seal member. The support member and the resilient seal member are arranged and configured such that the support member selectively contacts a spoke attachment portion of the rim to prevent full compression of the seal member when a radial force is applied to the support member to compress the seal member toward the spoke attachment portion of the rim.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
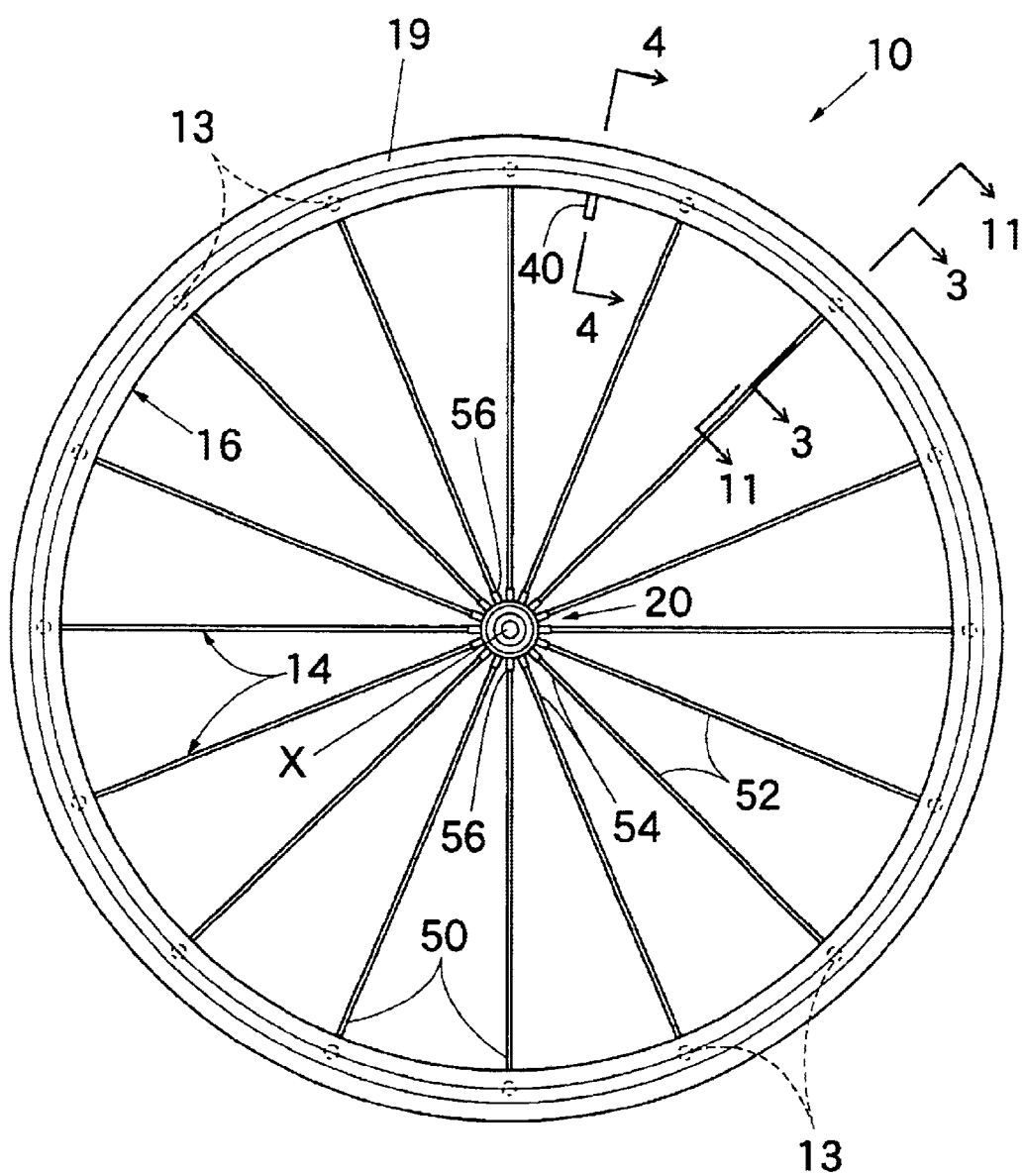
FIG. 1 is a side elevational view of a front bicycle wheel with a spoked rim assembly in accordance with a first preferred embodiment of the present invention.
Figure 2:
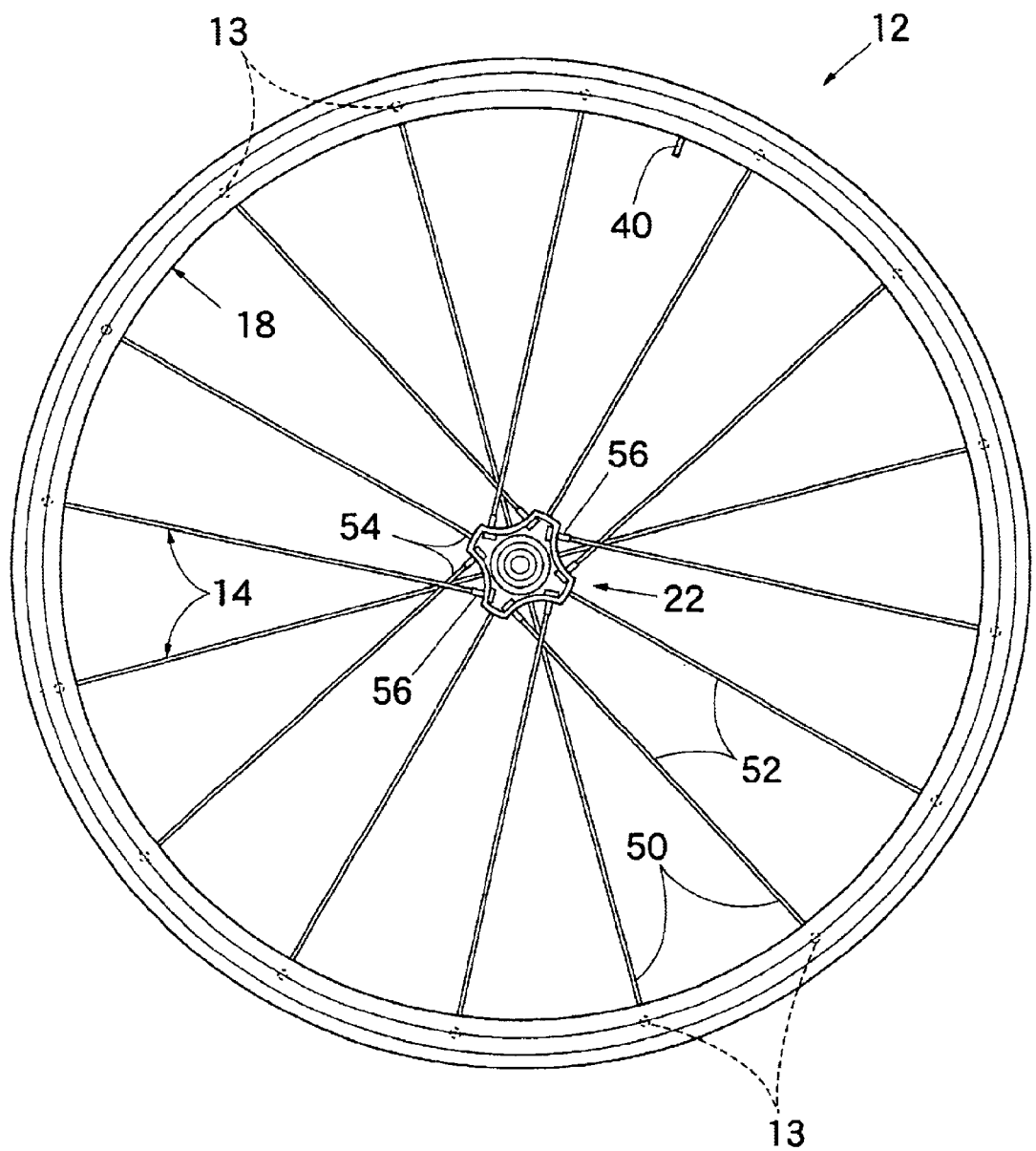
FIG. 2 is a side elevational view of a rear bicycle wheel with a spoked rim assembly in accordance with the first preferred embodiment of the present invention.

Referring initially to FIGS. 1 and 2, a front bicycle wheel 10 and a rear bicycle wheel 12 are illustrated with a plurality of seal structures 13 in accordance with the present invention. Each of the wheels 10 and 12 have a plurality of outwardly extending tension spokes 14 coupled to annular rims 16 and 18 of the wheels 10 and 12, respectively, with the seal structures 13 sealing the interfaces between the spokes 14 and the interiors of the annular rims 16 and 18 so that tubeless pneumatic tires 19 can be used with the rims 16 and 18, as discussed below in more detail. The spokes 14 are placed under tension such that the seal structures 13 seal the interfaces between the spokes 14 and the interiors of the annular rims 16 and 18.

The seal structures 13 together with the tension spokes 14 and one of the annular rims 16 and 18 form a spoked rim assembly in accordance with the present invention. The spokes 14 of the bicycle wheel 10 connect the rim 16 to a central hub 20, while the pokes 14 of the bicycle wheel 12 connect the rim 18 to a central hub 22. The rims 16 and 18 are designed to have the pneumatic tires 19 coupled thereto in a conventional manner.

In the illustrated embodiment, the front bicycle wheel 10 utilizes sixteen radial spokes 14 coupled to the rim 16 at equally spaced circumferential locations as seen in FIG. 1. On the other hand, the rear bicycle wheel 12 utilizes a first set of eight radial spokes 14 and a second set of eight tangential spokes 14 coupled to the rim 18 at equally spaced circumferential locations as seen in FIG. 2. Thus, the rims 16 and 18 are identical or substantially identical. Some of the spokes 14 coupled to the rim 18 are arranged at slightly different angles than the angles of the spokes 14 coupled to the rim 16. Thus, the rim 18 could be a slightly modified version of the rim 16 to accommodate this different spoking arrangement.

Of course, it will be apparent to those skilled in the art from this disclosure that bicycle wheels 10 and 12 could use modified rims and/or hubs in order to provide different spoking arrangements as needed and/or desired. Moreover, it will be apparent to those skilled in the art from this disclosure that the bicycle wheels 10 and/or 12 can have fewer or more spokes 14 if needed and/or desired. For example, the bicycle wheel 12 could have twenty-four spokes with twelve radial spokes and twelve tangential spokes. Moreover, while in the illustrated embodiment the spokes 14 are circumferentially equally spaced from each other, it will be apparent to those skilled in the art that the spokes 14 could be only slightly circumferentially offset from each other at the annular rim. In any case, preferably the spokes 14 are coupled to the annular rims 16 in a circumferentially spaced arrangement.

As mentioned above, each of the rims 16 and 18 is designed to have pneumatic tire 19 fastened thereto in a conventional manner as seen in FIGS. 1 and 2. The rims 16 and 18 are especially designed for use with a tubeless pneumatic tire. The rims 16 and 18 are preferably substantially identical. Thus, only rim 16 will be discussed and/or illustrated in detail herein. The rim 16 is designed for rotation about a center axis X and is constructed of a substantially rigid material, such as those materials, which are well known in the art. For example, the rim 16 can be constructed of any suitable metallic material, such as plated steel, stainless steel, aluminum, magnesium or titanium, as well as other non-metallic materials, such as a carbon fiber composite.

Figure 3:
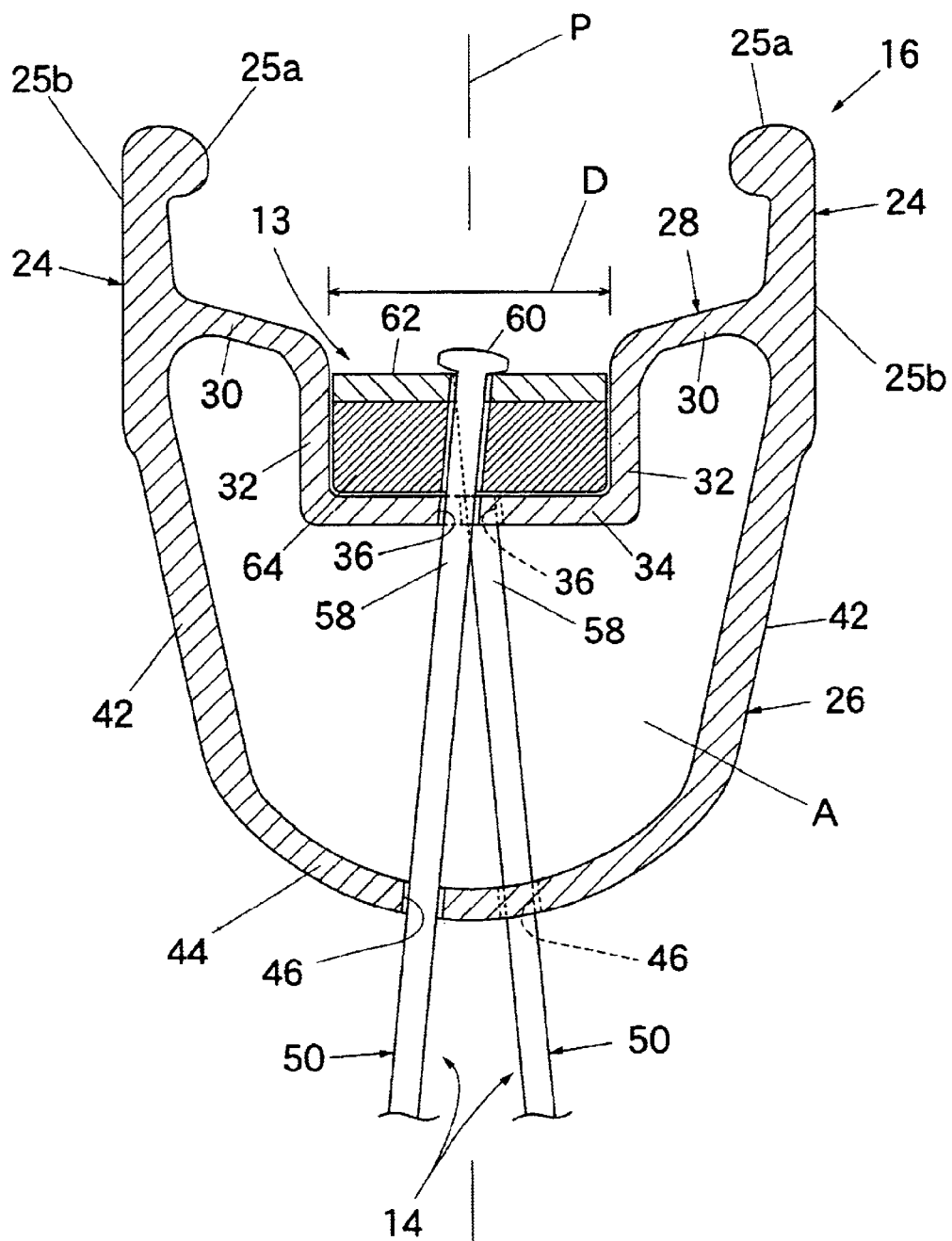
FIG. 3 is an enlarged, partial cross-sectional view of the front bicycle wheel illustrated in FIG. 1, as seen along section line 3—3 of FIG. 1.
Figure 4:
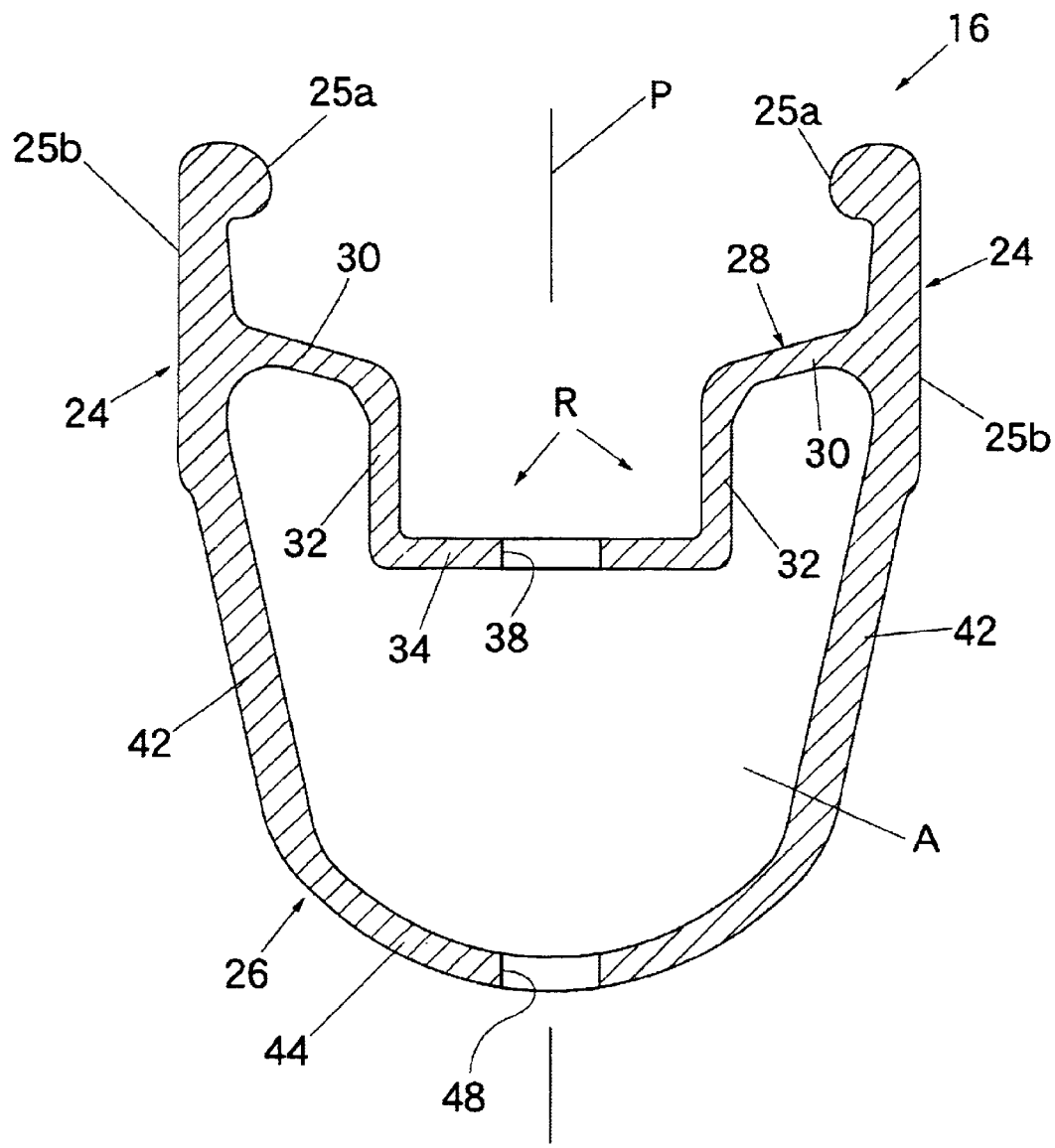
FIG. 4 is an enlarged, partial cross-sectional view of the front bicycle wheel illustrated in FIG. 1, as seen along section line 4—4 of FIG. 1, with the valve removed for the purpose of illustration.
Figure 5:
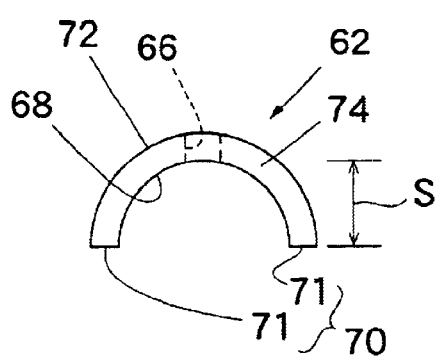
FIG. 5 is an end elevational view of a support member of the spoked rim assembly illustrated in FIGS. 1 and 3.
Figure 6:
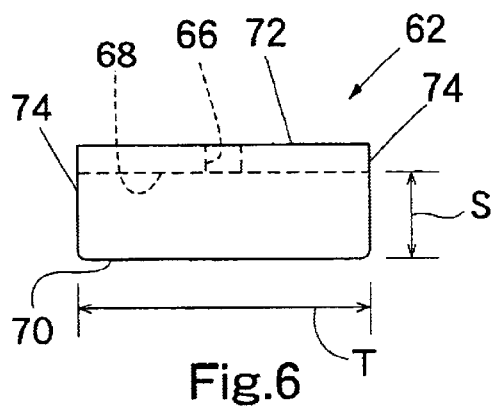
FIG. 6 is side elevational view of the support member illustrated in FIG. 5.
Figure 7:
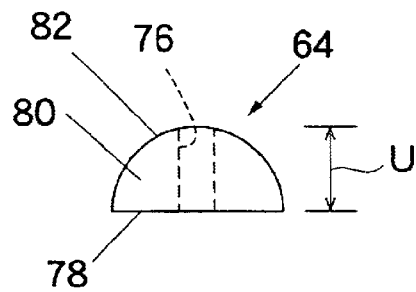
FIG. 7 is an end elevational view of a seal member of the spoked rim assembly illustrated in FIGS. 1 and 3.
Figure 8:
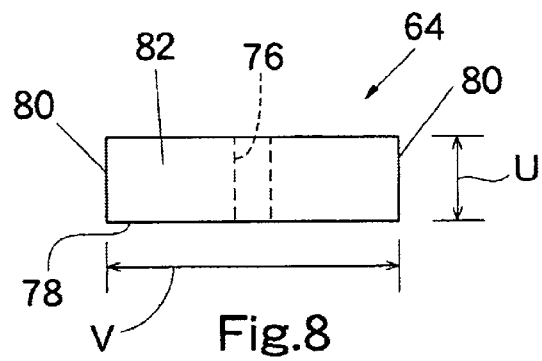
FIG. 8 is a side elevational view of the seal member illustrated in FIG. 7.

Referring to FIGS. 1, 3 and 4, the rim 16 is substantially circular as seen in side elevation (FIG. 1), and basically includes a pair (first and second) of annular side members 24, a U-shaped inner annular member 26 and a connecting member 28 extending between the annular side members 24. The ends of the U-shaped inner annular member 26 are coupled to the annular side members 24. The ends of the connecting member 28 are also preferably coupled to the annular side members 24 to form an annular hollow area A together with the inner annular member 26 that is located radially inwardly of the connecting member. An annular tire receiving recess is formed by the connecting member 28 together with the annular side members 24. The tire receiving recess is located radially outwardly of the connecting member 28. The annular side members 24, the inner annular member 26 and the annular connecting member 28 are preferably integrally formed together as a one-piece unitary member.

Referring still to FIGS. 3 and 4, the annular side members 24 are annular plate-shaped members formed with a pair (first and second) of ribs 25a and a pair (first and second) of braking surfaces 25b, respectively. The ribs 25a are designed to retain the beads of the tire 19 on the rim 16 (within the tire receiving recess) in a conventional manner. The tire receiving recess is located between the annular side members 24 (with the ribs 25a) at a radially outward location relative to the annular connecting member 28. The braking surfaces 25b face in opposite directions and are designed to contact a pair of brake pads of conventional rim brakes (not shown) in a conventional manner.

The annular connecting member 28 is a tubular member that basically extends axially between the annular side members 24. The annular connecting member 28 is fixedly coupled to the annular side members 24 at a radial position between the ribs 25a and the outer ends of the inner annular member 26. The annular connecting member 28 is configured to form an annular spoke attachment recess R, and basically includes a pair of connecting portions 30, a pair (first and second) of annular side portions 32 and an annular spoke attachment portion 34 with a plurality of spoke attachment openings 36 formed therein.

The connecting portions 30 are fixedly coupled to the annular side members 24 and extend substantially axially away from the annular side portions 30 to the annular side members 24. In particular, the connecting portions 30 preferably extend axially (e.g. tubular shaped), but are also preferably slightly angled relative to the annular side members 24. The annular side portions 32 extend radially inwardly from the connecting portions 30. The spoke attachment portion 34 extends in an axial direction between inner radial ends of the annular side portions 32.

The annular recess R of the connecting member 28 is basically formed by the annular side portions 32 and the annular spoke attachment portion 34 to form a substantially U-shaped transverse cross-section. Preferably, the annular side portions 32 are spaced a distance D from each other that corresponds to a transverse dimension of the outer ends of the spokes 14, as discussed below in more detail. Moreover, the first and second annular side portions 32 are preferably substantially parallel to each other, the annular side members 24 and a center plane P of the rim 16. The annular side portions 32 are also preferably substantially perpendicular to the annular spoke attachment portion 34 and located at a radially innermost location relative to the annular side members 32. Thus, when the spokes 14 are coupled to the spoke attachment portion 34 via the spoke attachment opening 36, parts of the spokes are preferably positioned in the spoke attachment recess R, as also discussed below in more detail.

As mentioned above, the spoke attachment portion 34 has a plurality of circumferentially arranged spoke attachment openings 36 formed therein. The spoke attachment portion also preferably includes a valve opening 38 formed therein for coupling a valve 40 thereto in a conventional manner, as seen in FIGS. 1 and 4. Preferably, the spoke attachment openings 36 are equally spaced from each other in the circumferential direction. The spoke attachment openings 36 are configured to receive portions of the spokes 14 therethrough, as discussed in more detail below. In particular, the alternating spoke attachment openings 36 are either slightly angled relative to the center plane P or slightly larger than the shafts of the spokes 14 received therein. Thus, the alternating spokes 14 can be slightly angled relative to each other and the center plane P to extend to opposite sides of the hub 20 or 22.

The inner annular member 26 is a tubular member that is substantially U-shaped (as seen in cross-section in FIGS. 3 and 4). The inner annular member 26 basically includes a pair of slanted portions 42 and a curved inner peripheral portion 44 fixedly coupled to the slanted portions 42. The slanted portions 42 are fixedly coupled to radially inner ends of the annular side members 24.

The inner peripheral portion 44 includes a plurality of circumferentially arranged spoke receiving openings 46 and a valve aperture 48. The valve aperture 48 is configured to mount part of the valve 40 therein in a conventional manner. The spoke receiving openings 46 are preferably equally space from each other in the circumferential direction. Similar to the spoke attachment openings 36, alternating spoke receiving opening 46 are either slightly angled relative to the center plane P or slightly larger than the shafts of the spokes 14 received therein. Thus, alternating spokes 14 can be slightly angled relative to the center plane P and extend to opposite sides of the hub 20 or 22.

Of course, because the spoke receiving openings 46 are located radially inwardly of the spoke attachment openings 36, the spoke receiving openings 46 will be either located further from the center plane P or extend further from the center plane P in order to accommodate the angled spokes 14. In the illustrated embodiment, the spoke receiving openings 46 are slightly angled relative to the center plane P and located axially further from the center plane P than the spoke attachment openings 36.

Referring now to FIGS. 1–3 and 5–14, the spokes 14 will now be discussed in more detail. Each of the spokes 14 is preferably a one-piece, unitary member that basically includes an outer end portion 50, a center or a middle portion 52 and an inner end portion 54, as seen in FIGS. 1 and 2. Each of the outer end portions 50 of the spokes 14 has one of the seal structures 13 coupled thereto, while each of the inner end portions 54 of spokes 14 preferably has external threads with a spoke nipple 56 threadedly coupled thereto, as discussed in more detail below. The spokes 14 are placed under tension such that the seal structures 13 seal the interfaces between the spokes 14 and the interiors of the annular rim 16.

In particular, each of the outer end portions 50 of the spokes 14 basically includes an outer shaft section 58 and an enlarged head 60. The outer shaft section 58 and the enlarged head 60 are integrally formed with the center portion 52 as a one piece unitary member. The outer shaft sections 58 of the outer end portions 50 extend through the spoke attachment openings 36 of the spoke attachment portion 34 with the enlarged head 60 retaining the outer end portions 50 of the spokes 14 to the rim 16.

The seal structures 13 are disposed on the outer shaft sections 58 and basically include a support member 62 and a resilient seal member 64. The shaft section 58 preferably has a circular cross-sectional shape that is substantially the same size as the center portion 52 and the inner end portion 54. The enlarged head 60 has a larger diameter or width than the shaft section 58 to engage an outer surface of the support member 62, as discussed below. One of the support members 62 and one of the seal members 64 are mounted on the each shaft section 58 such that the seal structures 13 are slideably mounted on the outer shaft sections 58 adjacent the enlarged heads 60 of each spoke 14 to seal the spoke attachment openings 36 from the tire receiving recess of the rim 16.

Referring now to FIGS. 3, 5, 6, 9 and 10, the support members 62 are preferably substantially U-shaped or C-shaped members constructed of lightweight rigid metallic material such as aluminum, steel or any other suitable material. The support members 62 are preferably located radially outwardly of the spoke attachment portion 34 and axially between the first and second annular side portions 32 (e.g. within the spoke attachment recess R) when the spokes 14 are coupled to the rim 16. Each of the support members 62 basically includes a through aperture 66, a compressing surface 68, a compression limiting surface 70, an outer surface 72 and a pair of end surfaces 74.

Each aperture 66 extends between the compressing surface 68 and the outer surface 72 of the respective support members 62 and is configured to receive one of the shaft sections 58 therethrough. Each aperture 66 is preferably centered in both the axial and circumferential directions. Each aperture 66 is preferably large enough to accommodate the slight angle of each shaft section. The compressing surface 68 and the outer surface 70 are substantially curved parallel surfaces that form a curved seal receiving recess that faces radially inwardly when the spokes 14 are coupled to the rim 16. Each of the compressing surfaces 68 is configured to selectively compress one of the seal members 64 in the radial direction and limit expansion of the seal member 64 in the circumferential direction, as discussed below in more detail.

The compression limiting 70 surface of each support member 62 is preferably formed of two sections 71 that connect the compressing surface 68 and the outer surface 72 in a circumferential direction. The sections 71 of the compression limiting surface 70 extend in the axial direction when the spokes 14 are coupled to the rim 16. Each compression limiting surface 70 is designed to selectively contact the spoke attachment portion 34 to limit compression of the respective seal member 64, as discussed below.

Each pair of end surfaces 74 of each support member 62 are preferably U-shaped or C-shaped surfaces that extend substantially in the radial direction when the spokes 14 are coupled to the rim 16. The end surfaces 74 are preferably designed to selectively contact or continuously contact the first and second annular side portions 32 of the spoke attachment recess R. More specifically, the seal receiving recess formed by the compressing surface 68 of each support member 62 has a radial dimension (thickness) S. Each support member 62 also preferably has an axial or transverse dimension T. The axial dimension T is preferably equal to or slightly smaller than the dimension D measured between the opposing annular side portions 32 of the spoke attachment recess R to limit translation and rotational movement of the support members 62.

The outer surface 72 of the support members are configured to engage the enlarged heads 62 of the spokes 14 such that the enlarged heads 60 apply a radial force on the support members 62 when the spoke nipples 56 are tightened (e.g., to tension the spokes 14). The resilient seal members 64 are preferably arranged in the seal receiving recesses of the support members 62, but are slightly larger than the recesses of the support members 62. Thus, the seal members 64 are compressed when the radial force is applied to the support members 62 by the enlarged heads 60, as discussed below in more detail.

Referring now to FIGS. 3 and 7–10, each seal member 64 is preferably constructed of a resilient sealing material such as, urethane foam, rubber or any other suitable resilient sealing material. Each seal member 64 basically includes a spoke opening 76, a sealing surface 78, a pair of end surfaces 80 and a curved outer surface 82. The curved outer surface 82 extends between opposite circumferential sides of the sealing surface 78. The end surfaces 80 are arranged at opposite axial ends of the sealing surface 78 and the outer surface 82. The end surfaces 80 extend at substantially right angles relative to both the sealing surface 78 and the curved outer surface 82.

Each spoke opening 76 has a spoke axis and is configured to receive one of the shaft sections 58 therethrough. In particular, each spoke opening 76 is preferably either slightly angled relative to the end surfaces 80 or substantially parallel to the end surfaces 80. If the spoke openings 76 are angled relative to the respective end surfaces 80, the slightly angled shaft sections of the spokes 14 can be easily accommodated. If the spoke openings 76 are parallel to the end surfaces 80, the resilient material of the seal members 64 will deflect/deform slightly in order to accommodate the slight angle of the shaft sections 58. In either case, the same seal members 64 can be used for alternating spokes 14. In other words, if the spoke openings 76 are angled, the orientation of the seal members 64 simply needs to be alternated with alternating spokes 14.

The curved outer surface 82 of each seal member 64 has configuration substantially identical to the configuration of the compressing surface 68 of each support member 62, except that each outer surface 82 is larger than each compressing surface 68. Thus, the seal members 64 can be arranged in the seal receiving recesses formed by the compressing surfaces 68 of the support members. More specifically, each seal member 64 has an uncompressed radial dimension U and an uncompressed axial dimension V. Of course, because the seal members 64 are constructed of resilient material, the shape and/or dimensions of the seal members will change when forces are applied thereto.

In any case, the uncompressed radial dimension (thickness) U of each seal member 64 is larger than the radial dimension S of the seal receiving recesses of the support members 62. On the other hand, the uncompressed axial or transverse dimension V is preferably substantially equal to the axial dimension T of the support members 62. Thus, the axial dimension V of each seal member 64 is also preferably substantially equal to or slightly less than the transverse dimension D measured between the first and second annular side portions 32 of the spoke attachment recess R. Thus, when the enlarged heads 60 apply a radial force on the support members 62, the resilient seal members 64 will be compressed in the radial direction and expand in the axial direction to create an airtight seal surrounding the shaft sections 58 and the spoke attachment openings 36, as discussed in more detail below.

The straight center portions 52 of the spokes 14 are located radially inwardly of the outer end portions 50, and the inner end portions 54 are located radially inwardly of the center portions 52. Each inner end portion 54 is preferably externally threaded for receiving one of the spoke nipples 56. Thus, each inner end portion 54 forms a hub attachment end of each spoke 14. The inner end portions 54 are coupled to the hubs 20 and 22 in a relatively conventional manner (i.e., radially to hub 20, or radially on one side of the hub 22 and tangentially on the other side of the hub 22). Preferably, the shaft section 58 and the head 60 of the outer end portion 50, the center portion 52 and the inner end portion 54 are constructed as a one-piece, unitary member with one of the spoke nipples 56 threadedly coupled to each inner end portion 54 of the spokes 14 for connection to the hub 20 or 22.

Of course, it will be apparent to those skilled in the art that the entire length of spokes 14 can be substantially uniform along their entire cross sections if needed and/or desired. It will also be apparent to those skilled in the art that constant cross section spokes can be utilized or spokes with a varying cross section can be utilized as needed and/or desired.

Figure 9:
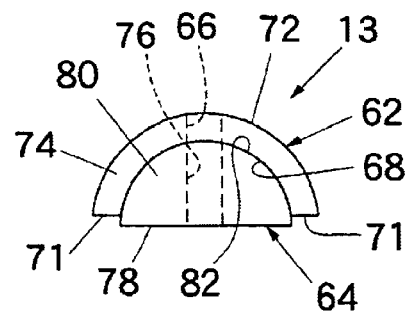
FIG. 9 is an end elevational view of the support member and seal member illustrated in FIGS. 5–8 with the seal member arranged in the seal receiving recess of the support member.
Figure 10:
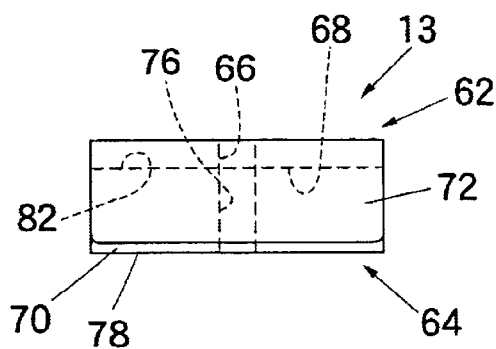
FIG. 10 is a side elevational view of the support member and seal member illustrated in FIG. 9.
Figure 11:
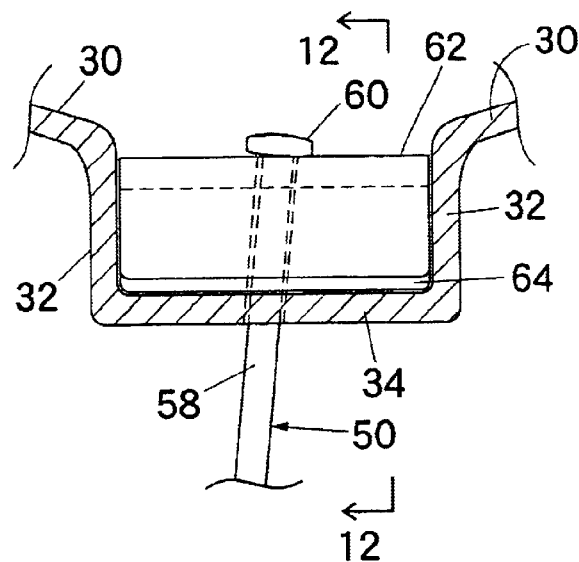
FIG. 11 is an enlarged, partial cross-sectional view of the front bicycle wheel illustrated in FIG. 1 as seen along section line 11—11 of FIG. 1 prior to applying a radial tension on the spoke.
Figure 12:
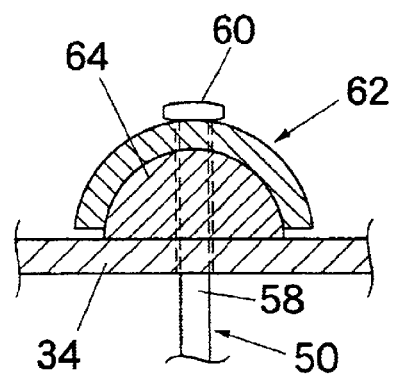
FIG. 12 is a cross-sectional view of the portion of the bicycle wheel illustrated in FIG. 11 as seen along section line 12—12 of FIG. 11.

Referring now to FIGS. 9–14, the connection of the spokes 14 to the rim 16 will now be discussed in more detail. First, each of the spokes 14 is assembled. In particular, the seal members 64 are first positioned in the seal receiving recesses formed by the compressing surfaces 68 of the support members 62 as seen in FIGS. 9 and 10. Then, the inner end portions 54 are inserted through the apertures 66 of the support members 62 and into the spoke openings 76 of the seal members 64. The center portions 52 are slid through the apertures 66 of the support members 62 and the spoke openings 76 of the seal members 64 so that the enlarged heads 60 are arranged adjacent the outer surfaces 72 of the support members 62. Thus, the shaft sections 58 are positioned within the through apertures 66 of the support members 62 and the spoke openings 76 of the seal members 64 as seen in FIGS. 11 and 12.

Next, the assembled spokes are coupled to the rim 16. In particular, the inner end portions 54 and the center portions 52 of the spokes 14 are inserted through the spoke attachment openings 36 and the spoke receiving openings 46 of the rim 16 from the radially outer side of the spoke attachment member 28. The outer end portions 50 of the spokes 14 are then positioned such that the support members 62 and the seal members 64 are arranged in the spoke attachment recess R, as also shown in FIGS. 11 and 12. This is prior to application of a radial force on the spokes 14.

Figure 13:
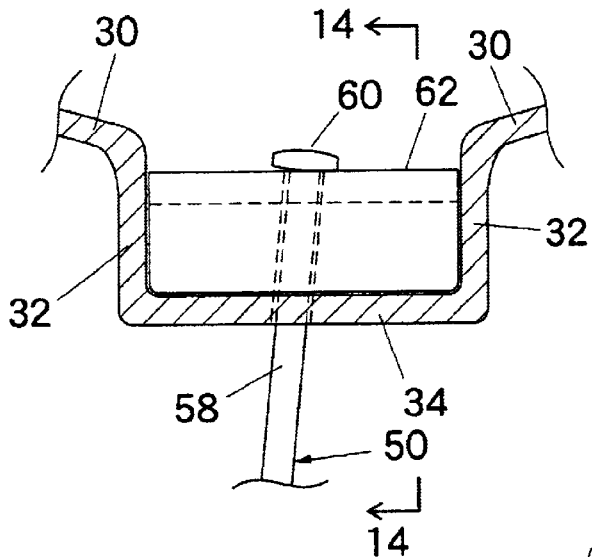
FIG. 13 is an enlarged, partial cross-sectional view of the front bicycle wheel illustrated in FIG. 1 as seen along section line 11—11 of FIG. 1 after applying a radial tension on the spoke.
Figure 14:
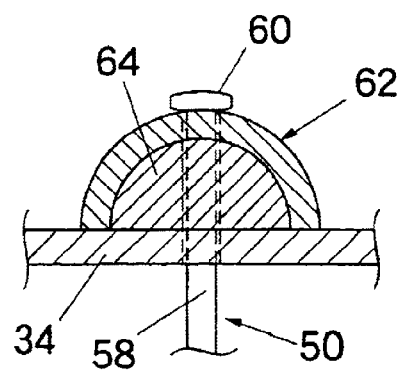
FIG. 14 is a cross-sectional view of the portion of the bicycle wheel illustrated in FIG. 13 as seen along section line 14—14 of FIG. 13.
Figure 15:
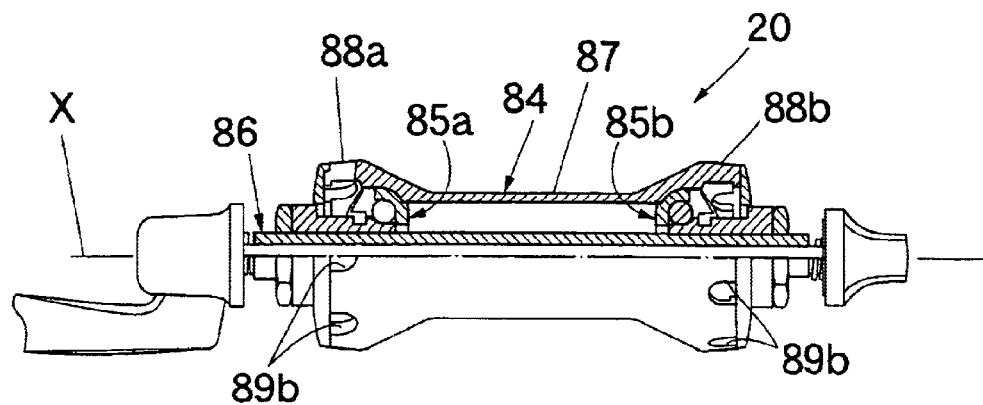
FIG. 15 is an enlarged, top plan view a front hub of the bicycle wheel illustrated in FIG. 1 with portions shown in cross-section for the purpose of illustration.
Figure 16:
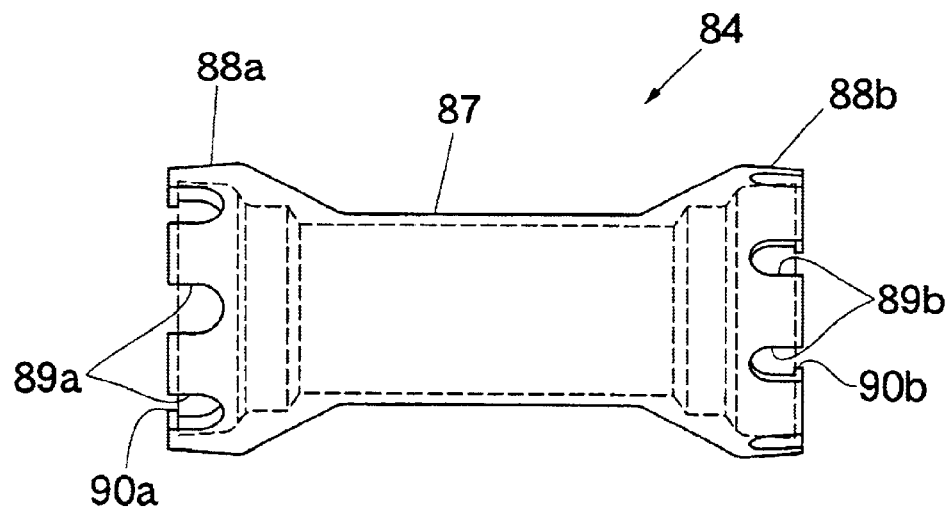
FIG. 16 is an enlarged, top plan view of the hub body of the front hub illustrated in FIG. 15.
Figures 17, 18:
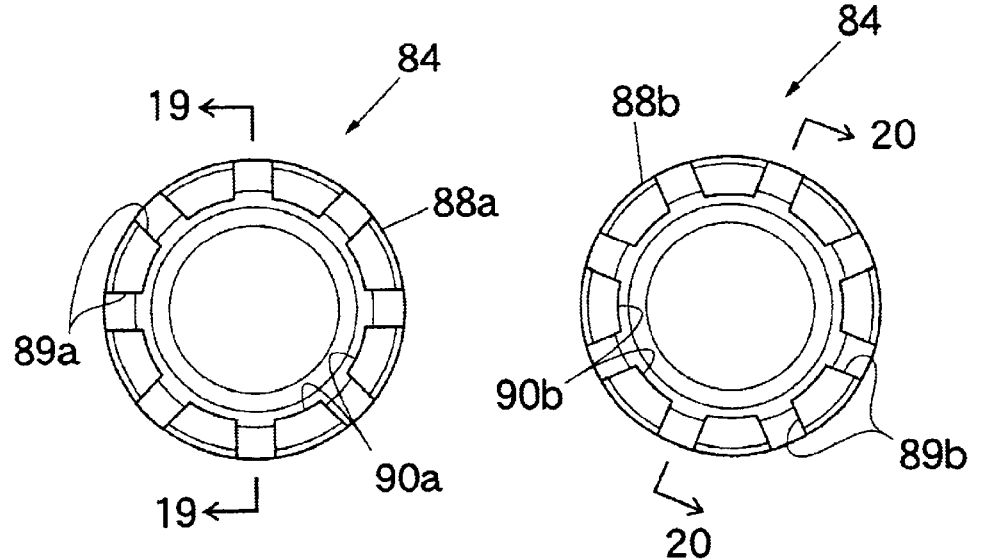
FIG. 17 is a left side elevational view of the hub body illustrated in FIG. 16.
FIG. 18 is a right side elevational view of the hub body illustrated in FIG. 16.
Figures 19, 20:
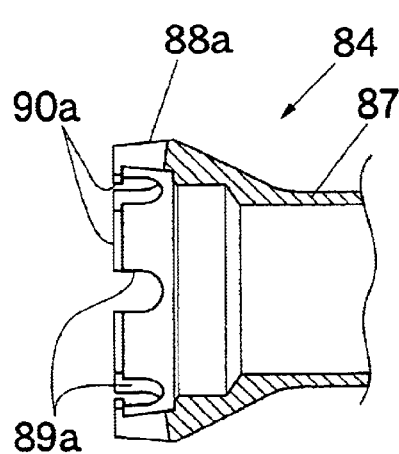
FIG. 19 is a partial cross-sectional view of the hub body illustrated in FIGS. 16–18, as seen along section line 19—19 of FIG. 17.
FIG. 20 is a partial cross-sectional view of the hub body illustrated in FIGS. 16–18, as seen along section line 20—20 of FIG. 18.
Figure 21:
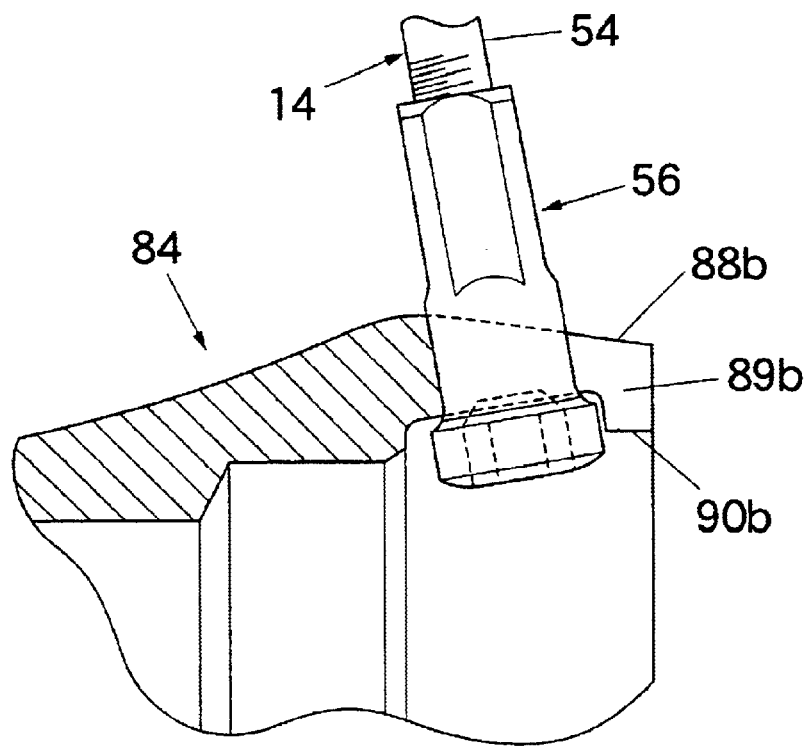
FIG. 21 is a partial, enlarged cross-sectional view of a portion of the hub body illustrated in FIGS. 16–18 with a spoke nipple arranged in a spoke hole.
Figure 22:
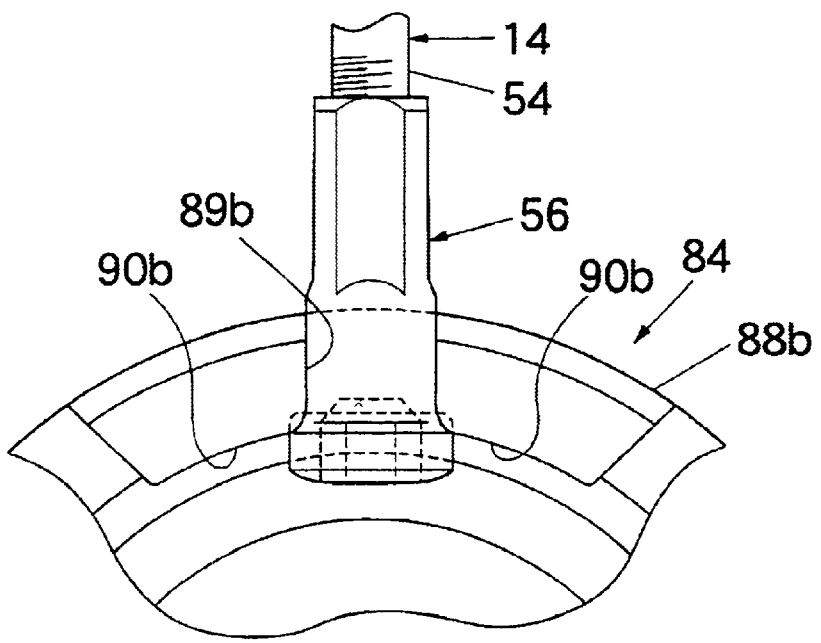
FIG. 22 is a right side elevational view of the portion of the hub body and spoke nipple illustrated in FIG. 21.
Figure 23:
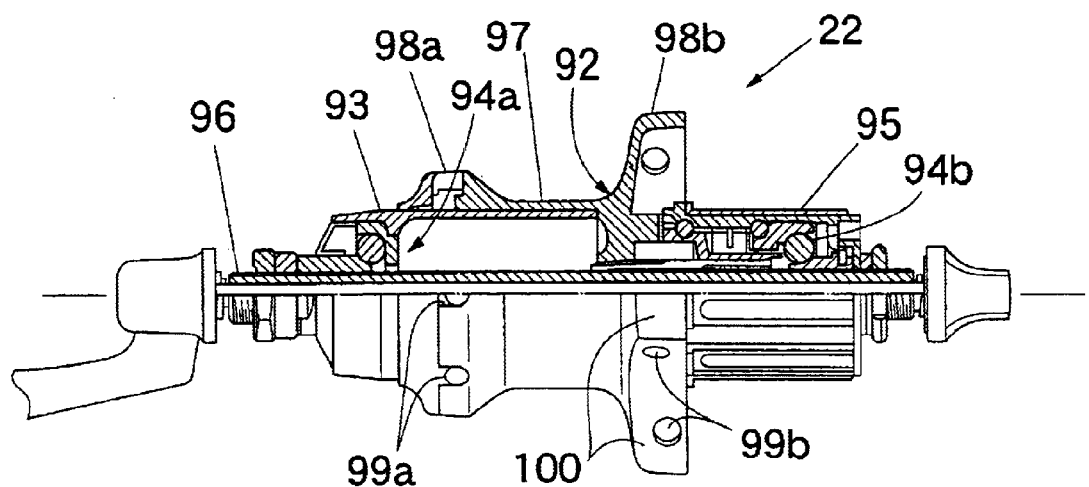
FIG. 23 is an enlarged, top plan view of a rear hub of the rear bicycle wheel illustrated in FIG. 2 with portions shown in cross-section for the purpose of illustration.
Figure 24:
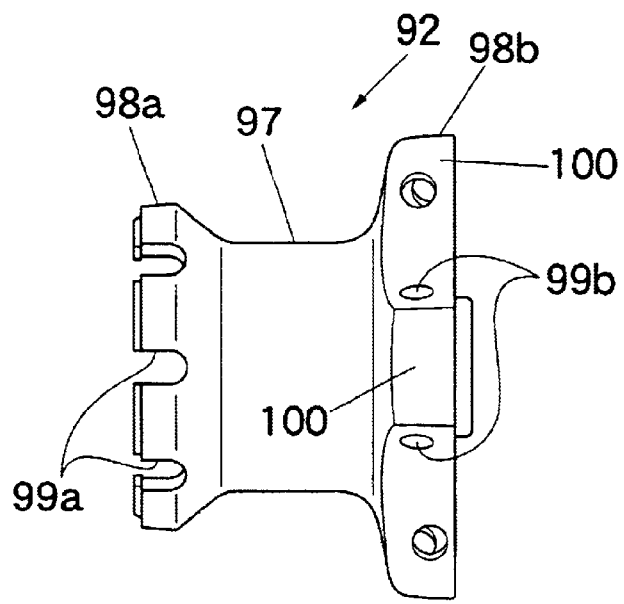
FIG. 24 is an enlarged, top plan view of the hub body of the rear hub illustrated in FIG. 23.
Figure 25:
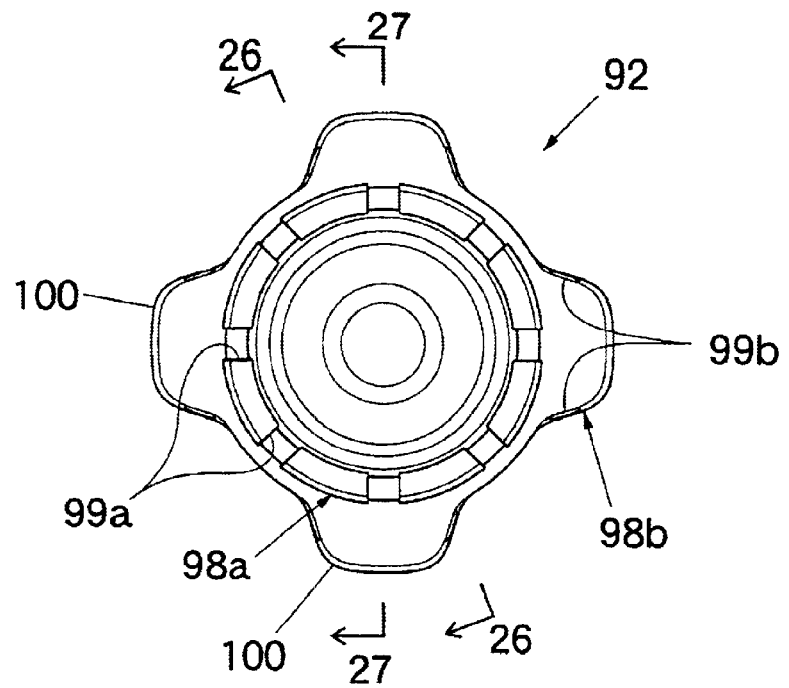
FIG. 25 is a left side elevational view of the hub body illustrated in FIG. 24.
Figure 26:
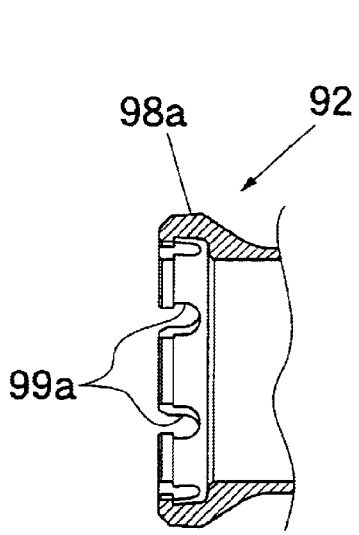
FIG. 26 is a cross-sectional view of the hub body illustrated in FIGS. 24 and 25, as seen along section line 26—26 of FIG. 25.
Figure 27:
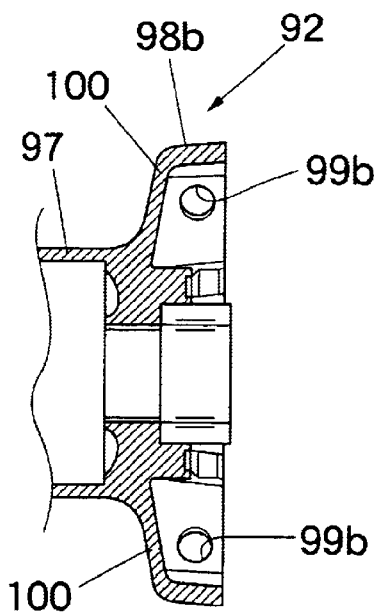
FIG. 27 is a cross-sectional view of the hub body illustrated in FIGS. 24 and 25, as seen along section line 27—27 of FIG. 25.
Figure 28:
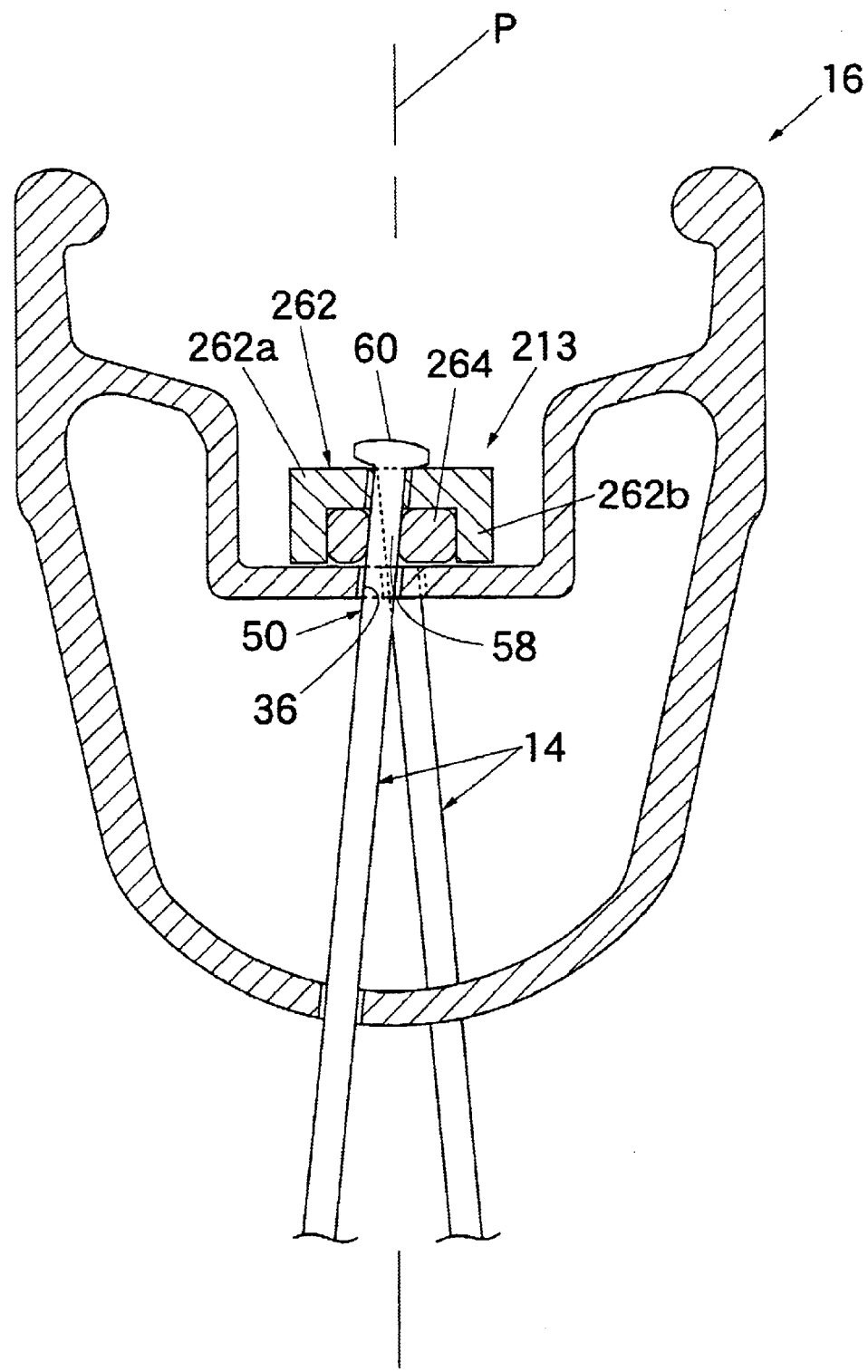
FIG. 28 is an enlarged, partial cross-sectional view of a portion of a spoked rim assembly in accordance with a second preferred embodiment of the present invention.
Figures 29, 30:
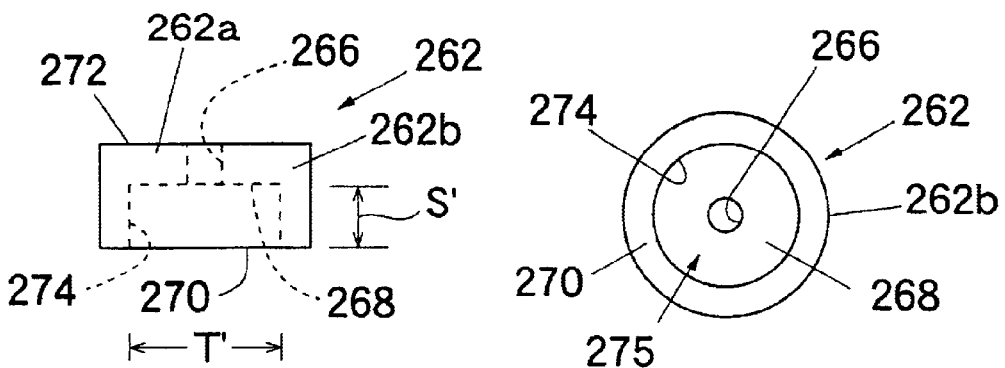
FIG. 29 is a side elevational view of a support member of the spoked rim assembly illustrated in FIG. 28.
FIG. 30 is bottom plan view of the support member illustrated in FIG. 29.
Figures 31, 32:
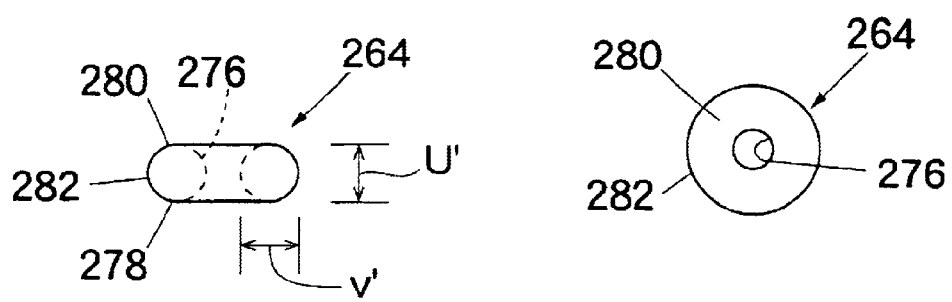
FIG. 31 is a side elevational view of a seal member of the spoked rim assembly illustrated in FIG. 28.
FIG. 32 is bottom plan view of the seal member illustrated in FIG. 31.
Figure 33:
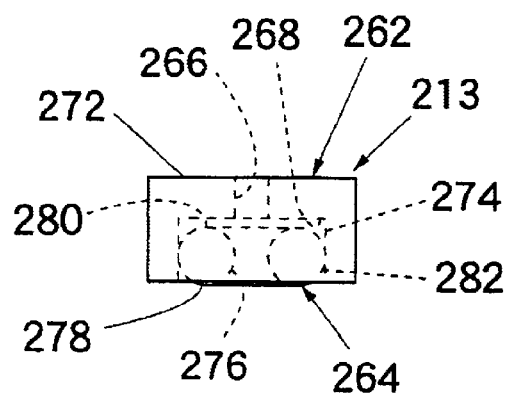
FIG. 33 is a side elevational view of the support member and seal member illustrated in FIGS. 29–32 with the seal member arranged in the seal receiving recess of the support member.
Figure 34:
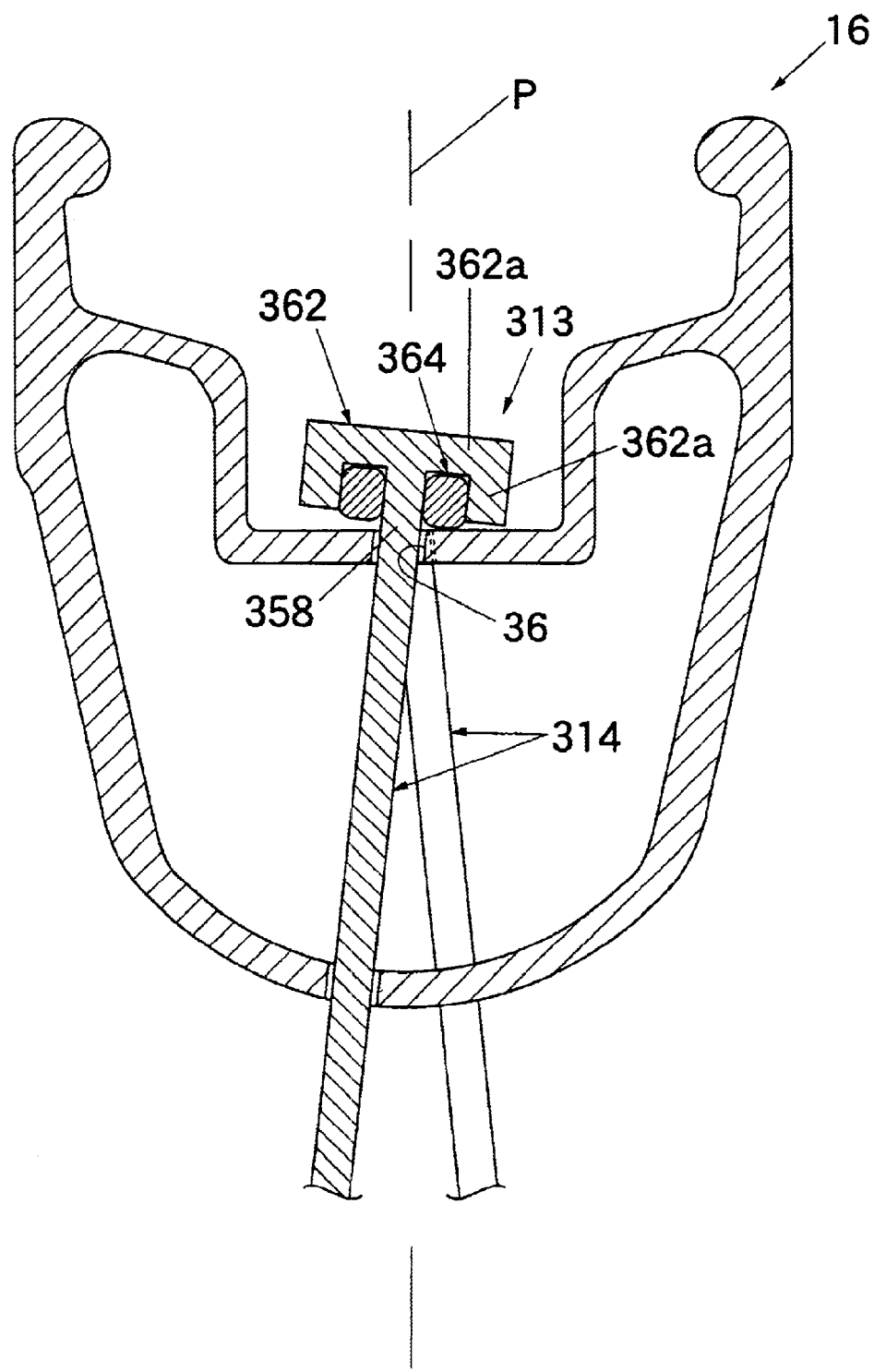
FIG. 34 is an enlarged, partial cross-sectional view of a portion of a spoked rim assembly in accordance with a third preferred embodiment of the present invention.
Figure 35:
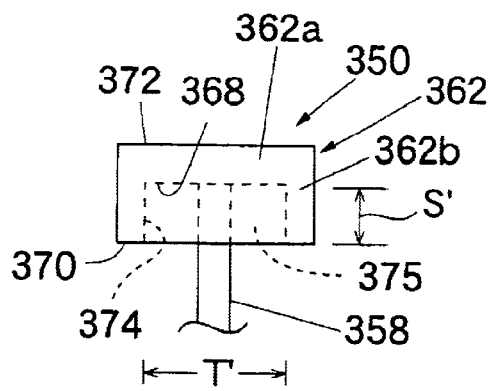
FIG. 35 is a partial side elevational view of an integral spoke/support member of the spoked rim assembly illustrated in FIG. 34.
Figure 36:
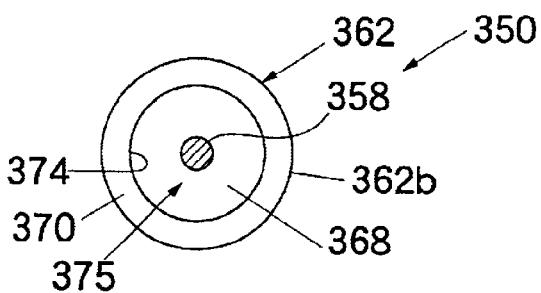
FIG. 36 is bottom plan view of the integral spoke/support member illustrated in FIG. 35.
Figure 37:
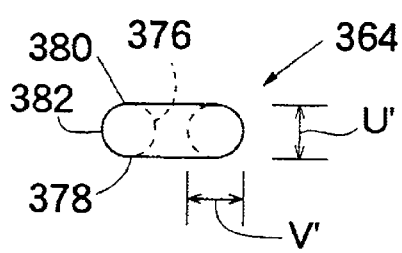
FIG. 37 is a side elevational view of a seal member of the spoked rim assembly illustrated in FIG. 34.
Figure 38:
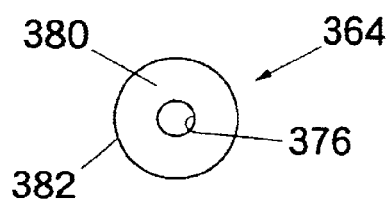
FIG. 38 is bottom plan view of the seal member illustrated in FIG. 37.
Figure 39:
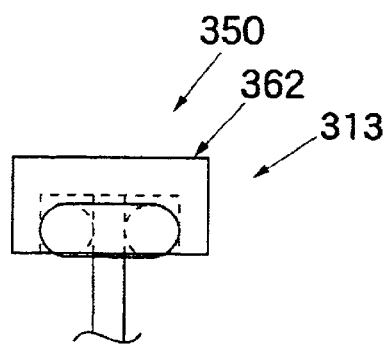
FIG. 39 is a side elevational view of the spoke/support member and seal member illustrated in FIGS. 35–38 with the seal member arranged in the seal receiving recess of the spoke/support member.

Next, the inner end portions 54 of the spokes 14 are coupled to either the hub 20 or the hub 22 via the spoke nipples 56 as discussed below. When the spoke nipples 56 are tightened, the enlarged heads 60 of the spokes 14 apply a radial force on the support members 64. When the enlarged heads 60 of the spokes 14 apply a radial force on the support members 64, the support members will move radially inwardly until the compression limiting surfaces 70 of the support members 62 contact the annular spoke attachment portion 34 of the spoke attachment recess R. The sealing surfaces 78 of the seal members 64 will be pressed against the spoke attachment portion 34 as seen in FIGS. 13 and 14.

When the support members 62 move radially inwardly, the resilient seal members 64 will be compressed in the radial direction. This compression of the seal members 64 in the radial direction will cause the seal members to expand in the axial direction. The axial expansion of the seal members 64 will create an airtight seal around the shaft sections 58 of the spokes 14. Similarly, the axial expansion of the seal members 64 will cause the end surfaces 80 of the seal members 64 to be pressed against the annular side portions 32 of the spoke attachment recess R to create air tight seal. The radial compression of the seal members 64 will also create an airtight seal between the compressing surfaces 68 of the support members 62 and the outer surfaces 82 of the seal members 64. Moreover, the radial compression of the seal members 64 will also create an airtight seal between the sealing surfaces 78 of the seal members 64 and the spoke attachment portion 34. Thus, a tubeless pneumatic tire 19 can be utilized with the rim 16 without air leakage.

Connections of the spokes 14 to the hubs 20 and 22 will now be discussed in more detail. The connections of the spokes 14 to the hubs 20 and 22 are basically identical to the connections disclosed in U.S. patent application Ser. No. 09/528,190, except as explained below. In particular, the hubs 20 and 22 are designed to be used with the rim 16 having circumferentially equally spaced spoke attachment points.

Front Hub

Referring to FIGS. 1 and 15–22, connection of the spokes 14 and the rim 16 to the front hub 20 will now be discussed in more detail. The front hub 20 basically includes a tubular hub body portion 84 a first bearing assembly 85a, a second bearing assembly 85b and a hub axle 86 rotatably supported in tubular body portion 84 by the bearing assemblies 85a and 85b. A quick release mechanism is coupled to the hub axle 86 in a conventional manner to couple the front hub 20 to a bicycle fork in a conventional manner. The parts of the front hub 20 are relatively conventional, and thus, the parts of the front hub 20 will not be discussed or illustrated in detail herein.

The tubular body portion 84 has tubular center portion 87 and a pair (first and second) of tubular mounting portions 88a and 88b fixedly coupled to opposite ends of center portion 87 for the mounting spokes 14 thereto. Preferably, the second mounting portion 88b is an offset mirror image of first mounting portion 88a. Each tubular mounting portion 88a and 88b has a plurality of spoke openings 89a and 89b for coupling the spokes 14 therein, respectively. Preferably, each mounting portion 88a and 88b has eight spoke openings 89a and 89b formed therein, respectively. The spoke openings 89b are preferably circumferentially offset from the spoke openings 89a so that the outer end portions 50 of the spokes 14 are circumferentially equally spaced from each other.

Preferably, the body portion 84 is formed as a one-piece, unitary member. It will be apparent to those skilled in the art from this disclosure that body portion 84 can be constructed of any substantially rigid material, such as those materials which are known in the art. For example, body portion 84 can be constructed of any suitable metallic material, such as plated steel, stainless steel, aluminum, magnesium or titanium, as well as other non-metallic materials, such as carbon fiber composite, ceramic or plastic. Moreover, center portion 87, mounting portion 88a and mounting portion 88b could be constructed of different materials as need and/or desired.

The pair of tubular mounting portions 88a and 88b support a plurality of the spokes 14 in spoke openings 89a and 89b with the spoke nipples 56. More specifically, the spokes 14 have the spoke nipples 56 threaded to their inner end portions 54, and the spoke nipples 56 are arranged in the spoke openings 89a and 89b to couple the front hub 20 to the annular rim 16. The spoke openings 89a and 89b are formed as elongated slots extending axially from free edges of the tubular mounting portions 88a and 88b, respectively. Moreover, the spoke openings 89a and 89b are sized to allow the spoke nipples 56 to be slidably received therein. Therefore, the spokes 14 with the spoke nipples 56 threadedly coupled thereto can be axially inserted in spoke openings 89a and 89b from opposite ends of the front hub 20.

The mounting portions 88a and 88b have a plurality of protrusions 90a and 90b fixedly coupled thereto and extending radially inwardly therefrom. The protrusions 90a and 90b are adjacent the spoke openings 89a and 89b to maintain the spoke nipples 56 therein. Specifically, the protrusions 90a and 90b are formed as circumferential internal flanges extending radially inwardly from the free edges of the mounting portions 88a and 88b toward the hub axle 86. With this arrangement, the protrusions 90a and 90b can engage heads of the spoke nipples 56 to prevent the spokes 14 from moving axially out of spoke openings 89a and 89b when the front wheel 10 is assembled.

Rear Wheel/Hub

Referring to FIGS. 2 and 23–27, connection of the spokes 14 and the rim 18 to the rear hub 22 will now be discussed in more detail. Rear hub 22 basically includes a tubular hub body portion 92, a bearing support sleeve 93, a first bearing assembly 94a, a second bearing assembly 94b, a freewheel mounting portion 95 and a hub axle 96. A quick release mechanism is coupled to the hub axle 96. The hub axle 96 is rotatably supported in the tubular body portion 92 by the bearing assemblies 94a and 94b. The freewheel mounting portion 95 is coupled to the body portion 92 in a conventional manner and has a plurality of splines for receiving a freewheel (not shown). The parts of the rear hub 22 are relatively conventional, and thus, the parts of the rear hub 22 will not be discussed and/or illustrated in detail herein.

The tubular body portion 92 has tubular center portion 97 and a pair (first and second) of tubular mounting portions 98a and 98b fixedly coupled to opposite ends of the center portion 97 for mounting the spokes 14 thereto. The second mounting portion 98b is different from first mounting portion 98a so that a free wheel (not shown) can be coupled to the rear hub 22. Each tubular mounting portion 98a and 98b has a plurality of spoke openings 99a and 99b for coupling the spokes 14 thereto. Preferably, each mounting portion 98a and 98b has eight (first and second) spoke openings 99a and 99b formed therein, respectively.

Preferably, the body portion 92 is formed as a one-piece, unitary member. It will be apparent to those skilled in the art from this disclosure that the body portion 92 can be constructed of any substantially rigid material, such as those materials, which are known in the art. For example, the body portion 92 can be constructed of any suitable metallic material, such as plated steel, stainless steel, aluminum, magnesium or titanium, as well as other non-metallic materials, such as carbon fiber composite, ceramic or plastic. Moreover, the center portion 97, the first mounting portion 98a and the second mounting portion 98b could be constructed of different materials as need and/or desired.

The pair of tubular mounting portions 98a and 98b support a plurality of spokes 14 in spoke openings 99a and 99b with spoke nipples 56. More specifically, spokes 14 have spoke nipples 56 threaded to their inner end portions 54, and spoke nipples 56 are arranged in spoke openings 99a and 99b to couple the rear hub 22 to the annular rim 18.

The first mounting portion 98a is identical to the first mounting portion 88a of the front hub 20, except that first mounting portion 98a has larger inner and outer diameters than the first mounting portion 88a. The mounting portion 98b is formed of a plurality of spoke attachment projections 100 and a tapered portion. The second mounting portion 98b is arranged on an opposite side of center portion 97 from the first mounting portion 98a. The tapered portion is an annular plate member that extends outwardly from center portion 97. Preferably, the mounting portion 98b has four spoke attachment projections 100 with a pair of opposing spoke openings 99b formed in each spoke attachment projection 100 for attaching eight spokes 14 thereto. Accordingly, the spoke nipples 56 and spokes 14 are maintained in second spoke openings 99b. The spoke attachment projections 100 are preferably circumferentially aligned with alternating spoke openings 99a of the first mounting portion 98a to provide the proper spoking arrangement.

The spoke openings 99b are preferably closed openings with circular cross-section to retain the spoke nipples 56 therein. Of course, second tubular mounting portion 98b can have more or fewer than four spoke attachment projections 100 as needed and/or desired. The number and shape of the spoke attachment projections 100 will depend upon the number of spokes, the type of spokes and the type of wheel. Moreover, each spoke attachment projection 100 can have more or fewer spoke openings 99b and the spoke openings can have different configurations as needed and/or desired.

The rim 18 of the rear wheel 12 is identical to the rim 16 of the front wheel 10, except the rim 18 is configured to receive some of the spokes 14 at slightly different angles than the spokes 14 coupled to the rim 16. In other words, the rim 18 is identical to the rim 16, except that the rim 18 includes spoke attachment openings and spoke receiving openings that are angled slightly differently from the spoke attachment openings 36 and the spoke receiving openings 46 of the rim 16. Of course, it will be apparent to those skilled in the art from this disclosure that various modifications can be made to the rims 16 and 18 depending on the desired spoking arrangement and the type of hub used as needed and/or desired.

SECOND EMBODIMENT

Referring now to FIGS. 28–33, portions of a modified spoked rim assembly in accordance with a second embodiment of the present invention will now be discussed. The spoked rim assembly of this second embodiment is identical to the first embodiment, except the spoked rim assembly of this second embodiment includes with a modified seal structure 213 (only one illustrated in detail) that coupled between each of the spokes 14 and the rim 16 (only a portion shown) of the first embodiment. Thus, the modified seal structures 213 are also designed to be used with the hub 20 of the first embodiment. However, it will be apparent to those skilled in the art from this disclosure that the modified seal structure 213 can be used with the rim 18 and the hub 22, if needed and/or desired. Moreover, it will be apparent to those skilled in the art from this disclosure that sixteen of the modified seal structure (only one shown) would be used with either the rim 16 or the rim 18.

In view of the similarities between this second embodiment and the first embodiment, discussed above, this second embodiment will not be discussed and/or illustrated in detail herein. Rather, the following description will focus mainly on the differences between this second embodiment and the first embodiment. Moreover, it will be apparent to those skilled in the art from this disclosure that most of the descriptions and/or illustrations of the first embodiment also apply to this second embodiment except as explained below.

Each of the modified seal structure 213 basically includes a cup shaped support member 262 and an O-ring type of seal member 264, which are modified versions of the support members 62 and the seal members 64 of the first embodiment. Specifically, the support members 262 are annular cup-shaped members, while the seal members 264 are substantially O-shaped resilient members. One of the support members 262 and one of the seal members 264 are mounted on each shaft section 58 to form the modified seal structure 213 that is slideably mounted on the outer shaft sections 58 of the spokes 14 to seal the spoke attachment openings 36 from the tire receiving recess of the rim 16 in a manner substantially identical to the first embodiment.

The support member 262 includes a circular end wall 262a and an annular wall 262b extending from the circular end wall 262a. The circular end wall 262a has a spoke receiving aperture 266 extending therethrough. The circular end wall 262a has a compressing surface 268 facing in a radial direction and an outer surface 272. The annular wall 262b has an annular compression limiting surface 270 at its free end and an interior compressing surface 274. The compressing surface 268 and the compressing surface 274 form a recess 275 that has a radial dimension (depth) S' and a transverse dimension or outer diameter T'. The recess 275 has the seal member 264 disposed therein. The compressing surface 274 also acts to limit expansion of the seal member 264 in the axial and circumferential directions (e.g. similar to the compressing surface 68 and the annular side portions 32 of the first embodiment). In other words, because the support members 262 are annular cup-shaped members, the support members 262 limit axial expansion of the seal members 264 by itself instead of using the annular side portions 32 as in the first embodiment.

The seal member 264 is preferably constructed of a resilient sealing material such as, urethane foam, rubber or any other suitable resilient sealing material. The seal member 264 basically includes a spoke opening 276, a rim sealing surface 278, a support sealing surface 280 and an annular outer surface 282. The seal member 264 has an uncompressed radial dimension (thickness) U' measured between the rim sealing surface 278 and the support sealing surface 280. This uncompressed radial dimension (thickness) U' of the seal member 264 is larger than the radial dimension or depth S' of the recess 275. The seal member 264 also has a transverse dimension or thickness V' that is greater than half of the transverse dimension or outer diameter T' of the recess 275 minus the diameter of the outer shaft section 58 of the spoke 14.

Thus, the support member 262 and the seal member 264 are configured so that the seal member 264 contacts the shaft section 58 to create a seal therebetween when the seal member 264 is compressed in the radial direction against the rim 16 by the tension of the spokes 14. Moreover, the support member 262 and the seal member 264 are configured so that the seal member 264 contacts the rim 16 to create a seal therebetween when the seal member 264 is compressed in the radial direction against the rim 16 by the tension of the spokes 14.

THIRD EMBODIMENT

Referring now to FIGS. 34–39, portions of a modified spoked rim assembly in accordance with a third embodiment of the present invention will now be discussed. The spoked rim assembly of this third embodiment is identical to the first embodiment, except the spoked rim assembly of this third embodiment includes modified spokes 314 (only one illustrated in detail) with modified seal structures 313 that is partially integrated with the spokes 314. The spokes 314 are illustrated as being used with the rim 16 (only a portion shown) of the first embodiment. Thus the modified spokes 314 are also designed to be used with the hub 20 of the first embodiment. However, it will be apparent to those skilled in the art from this disclosure that the modified spokes 314 can be used with the rim 18 and the hub 22, if needed and/or desired. Moreover, it will be apparent to those skilled in the art from this disclosure that sixteen of the modified seal structures 313 and the modified spokes 314 would be used with either the rim 16 or the rim 18.

In view of the similarities between this third embodiment and the first embodiment, discussed above, this third embodiment will not be discussed and/or illustrated in detail herein. Rather, the following description will focus mainly on the differences between this third embodiment and the first embodiment. Moreover, it will be apparent to those skilled in the art from this disclosure that most of the descriptions and/or illustrations of the first embodiment also apply to this third embodiment except as explained below.

Each of the spokes 314 basically includes a modified outer end portion 350, a center or a middle portion (not shown) and an inner end portion (not shown). The inner end portions and the middle portions of the spokes 314 are identical to the inner end portions 54 and the center portions 52 of the first embodiment. However, the outer end portions 350 are modified versions of the outer end portions 50 of the first embodiment and include parts of the he modified seal structures 313. In particular, each of the outer end portions 350 of the spokes 314 basically includes an outer shaft section 358 and an enlarged head 360 with an integrated support member 262 that receives a resilient seal member 364. The seal members 364 are substantially O-shaped resilient members like the second embodiment.

The support member 362 includes a circular end wall 362a and an annular wall 362b extending from the circular end wall 362a. The circular end wall 362a has the spoke 314 extending outwardly from its center to form an annular recess 375. The circular end wall 362a has a compressing surface 368 facing in a radial direction and an outer surface 372. The annular wall 362b has an annular compression limiting surface 370 at its free end and an interior compressing surface 374. The compressing surface 368 and the compressing surface 374 form the recess 375 that has a radial dimension (depth) S' and a transverse dimension or outer diameter T'. The recess 375 has the seal member 364 disposed therein. The compressing surface 374 also acts to limit expansion of the seal member 364 in the axial and circumferential directions (e.g. similar to the compressing surface 68 and the annular side portions 32 of the first embodiment). In other words, because the support members 362 are annular cup-shaped members, the support members 362 limit axial expansion of the seal members 364 by itself instead of using the annular side portions 32 as in the first embodiment.

The seal member 364 is preferably constructed of a resilient sealing material such as, urethane foam, rubber or any other suitable resilient sealing material. The seal member 364 basically includes a spoke opening 376, a rim sealing surface 378, a support sealing surface 380 and an annular outer surface 382. The seal member 364 has an uncompressed radial dimension (thickness) U' measured between the rim sealing surface 378 and the support sealing surface 380. This uncompressed radial dimension (thickness) U' of the seal member 364 is larger than the radial dimension or depth S' of the recess 375. The seal member 364 also has a transverse dimension or thickness V' that is greater than half of the transverse dimension or outer diameter T' of the recess 375 minus the diameter of the outer shaft section 358 of the spoke 314.

Thus, the support member 362 and the seal member 364 are configured so that the seal member 364 contacts the shaft section 358 to create a seal therebetween when the seal member 364 is compressed in the radial direction against the rim 16 by the tension of the spokes 314. Moreover, the support member 362 and the seal member 364 are configured so that the seal member 364 contacts the rim 16 to create a seal therebetween when the seal member 364 is compressed in the radial direction against the rim 16 by the tension of the spokes 314.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A spoked rim assembly for a bicycle, comprising:
an annular rim having an annular recess with a first annular side portion, a second annular side portion and an annular spoke attachment portion extending between said first and second annular side portions to form a substantially U-shaped transverse cross-section, said annular spoke attachment portion having a plurality of circumferentially arranged spoke attachment openings formed therein; and
a plurality of inwardly extending spokes with each of said spokes having an outer end portion coupled to one of said spoke attachment openings and an inner end portion located radially inwardly of said outer end portion, each of said outer end portions including a support member and a resilient seal member,
said support members and said resilient seal members being arranged and configured such that said support members selectively contact said spoke attachment portion to prevent full compression of said seal members when a radial force is applied to said support members to compress said seal members.

2. The spoked rim assembly according to claim 1, wherein said support members are at least partially located on a radially outer side of said spoke attachment portion and said seal members are at least partially arranged between said spoke attachment portion and said support members.

3. The spoked rim assembly according to claim 1, wherein each of said outer end portions of said spokes has a shaft section and each of said support members has an aperture that has one of said shaft sections of one of said spokes extending therethrough.

4. The spoked rim assembly according to claim 3, wherein each of said outer end portions of said spokes includes an enlarged head that engages one of said support members to apply said radial force.

5. The spoked rim assembly according to claim 4, wherein each of said support members has a substantially U-shaped configuration to form a seal receiving recess with one of said seal members located in each of said seal receiving recesses.

6. The spoked rim assembly according to claim 5, wherein said support members are arranged such that each of said seal receiving recesses extends in a transverse direction relative to said rim and faces radially inwardly toward said annular spoke attachment portion.

7. The spoked rim assembly according to claim 6, wherein each of said seal members has a radial dimension larger than a radial dimension of each of said seal receiving recesses of said support members prior to compression of said seal members.

8. The spoked rim assembly according to claim 7, wherein each of said support members and each of said seal members has a transverse dimension substantially equal to a transverse distance measured between said first and second annular side portions prior to compression of said seal members.

9. The spoked rim assembly according to claim 8, wherein each of said seal members has a shape substantially corresponding in shape to each of said seal receiving recesses of each of said support members.

10. The spoked rim assembly according to claim 4, wherein
each of said support members has a substantially annular cup-shaped configuration to form a substantially annular seal receiving recess with one of said seal members located in each of said seal receiving recesses.

11. The spoked rim assembly according to claim 10, wherein
each of said seal members is an annular ring shaped member with a radial dimension larger than a radial dimension of each of said seal receiving recesses prior to compression of said seal members.

12. The spoked rim assembly according to claim 1, wherein
each of said support members has a substantially U-shaped configuration to form a seal receiving recess with one of said seal members located in each of said seal receiving recesses.

13. The spoked rim assembly according to claim 12, wherein
said support members are arranged such that each of said seal receiving recesses extends in a transverse direction relative to said rim and faces radially inwardly toward said annular spoke attachment portion.

14. The spoked rim assembly according to claim 13, wherein
each of said seal members has a radial dimension larger than a radial dimension of each of said seal receiving recesses of said support members prior to compression of said seal members.

15. The spoked rim assembly according to claim 14, wherein
each of said support members and each of said seal members has a transverse dimension substantially equal to a transverse distance measured between said first and second annular side portions prior to compression of said seal members.

16. The spoked rim assembly according to claim 1, wherein
said seal members are constructed of rubber.

17. The spoked rim assembly according to claim 1, wherein
said rim includes a substantially U-shaped inner annular member extending radially inwardly of said annular recess to form an annular hollow area, said inner annular member having a plurality of circumferentially arranged spoke receiving openings aligned with said spoke attachment openings of said spoke attachment portion.

18. The spoked rim assembly according to claim 1, further comprising:
a hub coupled to said inner end portions of said spokes.

19. The spoked rim assembly according to claim 1, wherein
each of said support members has a substantially annular cup-shaped configuration to form a substantially annular seal receiving recess with said seal members located in said seal receiving recesses.

20. The spoked rim assembly according to claim 19, wherein
each of said seal members is an annular ring shaped member with a radial dimension larger than a radial dimension of each of said seal receiving recesses prior to compression of said seal members.

21. The spoked rim assembly according to claim 20, wherein
said support members are integrally formed with said outer end portions of said spokes.

22. The spoked rim assembly according to claim 20, wherein
each of said outer end portions of said spokes has a shaft section and each of said support members has an aperture that has one of said shaft sections of one of said spokes extending therethrough.

23. The spoked rim assembly according to claim 22, wherein
each of said outer end portions of said spokes includes an enlarged head that engages one of said support members to apply said radial force.

24. The spoked rim assembly according to claim 1, wherein
said support members are arranged and configured to limit circumferential expansion of said seal members.

25. The spoked rim assembly according to claim 24, wherein
said first and second annular side portions of said annular recess are arranged and configured to limit transverse expansion of said seal members.

26. The spoked rim assembly according to claim 24, wherein
said support members are further arranged and configured to limit transverse expansion of said seal members.

27. The spoked rim assembly according to claim 1, wherein
each of said support members includes a seal receiving recess with one of said seal members partially located in each of said seal receiving recesses prior to compression of said seal members.

28. A seal structure for a spoked rim assembly, comprising:
a support member; and
a resilient seal member,
said support member and said resilient seal member being arranged and configured such that said support member selectively contacts a spoke attachment portion of the rim to prevent full compression of said seal member when a radial force is applied to said support member to compress said seal member toward the spoke attachment portion of the rim.

29. The seal structure according to claim 28, wherein
said support member includes a seal receiving recess with said seal member partially located in said seal receiving recess.

30. The seal structure according to claim 29, wherein
said seal member has a thickness larger than a depth of said seal receiving recess.

31. The seal structure according to claim 30, wherein
said support member is arranged and configured to limit expansion of said seal member in at least one transverse direction.

32. The seal structure according to claim 31, wherein
said support member has a substantially U-shaped configuration to form said seal receiving recess.

33. The seal structure according to claim 31, wherein
said support member is further arranged and configured to limit transverse expansion of said seal member in a pair of transverse directions substantially perpendicular to each other.

34. The seal structure according to claim 33, wherein
said support member has a substantially annular cup-shaped configuration to form a substantially annular seal receiving recess.

35. The seal structure according to claim 33, wherein
said support member is integrally formed with an outer end portion of a spoke.

36. The seal structure according to claim 28, wherein said seal member is constructed of rubber.

37. The seal structure according to claim 28, wherein
said support member includes a compressing surface and a compression limiting surface; and said seal member includes a spoke opening with a spoke axis, said support member and said seal member are further arranged and configured such that said compressing surface of said support portion applies a compressive force on said seal member upon application of said radial force on said support member substantially along said spoke axis, and said compression limiting surface selectively contacts the spoke attachment portion of the rim to prevent full compression of said seal member.

* * * * *